United States Patent
Arai

(10) Patent No.: US 9,856,765 B2
(45) Date of Patent: Jan. 2, 2018

(54) EXHAUST CHAMBER FOR SADDLE-RIDING TYPE VEHICLE

(71) Applicant: Kawasaki Jukogyo Kabushiki Kaisha, Hyogo (JP)

(72) Inventor: Kozo Arai, Chonburi (TH)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 233 days.

(21) Appl. No.: 14/829,356

(22) Filed: Aug. 18, 2015

(65) Prior Publication Data

US 2016/0061073 A1    Mar. 3, 2016

(30) Foreign Application Priority Data

Aug. 28, 2014    (JP) ................. 2014-174378

(51) Int. Cl.
*F01N 1/00* (2006.01)
*F01N 1/08* (2006.01)
*F01N 13/14* (2010.01)

(52) U.S. Cl.
CPC .............. *F01N 1/08* (2013.01); *F01N 13/14* (2013.01); *F01N 2310/02* (2013.01); *F01N 2490/04* (2013.01); *F01N 2490/155* (2013.01); *F01N 2590/04* (2013.01)

(58) Field of Classification Search
CPC ...... F01N 1/08; F01N 13/14; F01N 2490/155; F01N 2310/02
USPC .................. 181/232, 249, 255; 60/323, 324
See application file for complete search history.

(56) References Cited

U.S. PATENT DOCUMENTS

| | | | | |
|---|---|---|---|---|
| 2009/0110822 | A1* | 4/2009 | Brandt | F01N 1/04 427/238 |
| 2010/0307632 | A1* | 12/2010 | Nilsson | B05B 7/1409 141/1 |
| 2012/0267189 | A1* | 10/2012 | Wirth | F01N 1/026 181/212 |
| 2013/0068554 | A1* | 3/2013 | Hayama | F01N 13/14 181/228 |
| 2013/0075192 | A1* | 3/2013 | Hayama | F01N 3/2885 181/228 |

FOREIGN PATENT DOCUMENTS

JP    2009-041562    2/2009

* cited by examiner

Primary Examiner — Jason Shanske

(57) ABSTRACT

An exhaust chamber is disposed in an exhaust passage through which exhaust gas from an engine passes. The exhaust chamber includes: an inner case having a chamber expansion region therein; and an outer case configured to cover a portion of the inner case. The inner case has a first inner case half and a second inner case half which are obtained by division into two parts, and is formed by the first inner case half and the second inner case half being joined to each other at an inner joining portion. The outer case has a first outer case piece and a second outer case piece which are spaced from each other. The first outer case piece and the second outer case piece are each joined to a portion, on an outer surface of the inner case, which portion is different from the inner joining portion.

14 Claims, 4 Drawing Sheets

EXHAUST CHAMBER FOR SADDLE-RIDING TYPE VEHICLE

CROSS REFERENCE TO THE RELATED APPLICATION

This application is based on and claims Convention priority to Japanese patent application No. 2014-174378, filed Aug. 28, 2014, the entire disclosure of which is herein incorporated by reference as a part of this application.

BACKGROUND OF THE INVENTION (Field of the Invention)

The present invention relates to exhaust chambers disposed in exhaust passages through which exhaust gas from engines of saddle-riding type vehicles pass.

(Description of Related Art)

It has been known that saddle-riding type vehicles such as motorcycles have exhaust chambers in exhaust passages through which exhaust gas from engines pass (for example, JP Laid-open Patent Publication No. 2009-041562). The exhaust chamber is disposed upstream of a muffler positioned at a downstream end of the exhaust passage with respect to a direction of flow of the exhaust gas. Such an exhaust chamber allows sufficient muffling effect for exhaust gas to be obtained without increasing a size of the muffler.

An exhaust chamber is generally formed so as to have a so-called "two-part structure" obtained by two divisional parts being joined to each other since the shape of the exhaust chamber is complicated in many cases. Further, in order to enhance silencing effect, it is advantageous that the exhaust chamber has a great capacity. However, when the capacity is increased, a planar portion of the outer shape tends to be increased, and vibration sound is more likely to be radiated due to vibration of the exhaust chamber.

SUMMARY OF THE INVENTION

An object of the present invention is to provide an exhaust chamber, for a saddle-riding type vehicle, which enables radiated vibration sound to be reduced while allowing a sufficient capacity to be assured.

In order to accomplish the above object, an exhaust chamber for a saddle-riding type vehicle according to the present invention is disposed in an exhaust passage through which exhaust gas from an engine of the saddle-riding type vehicle passes, and includes: an inner case having a chamber expansion region therein; and an outer case configured to cover at least a portion of the inner case. The inner case has a first inner case half and a second inner case half which are obtained by division into two parts, and is formed by the first inner case half and the second inner case half being joined to each other at an inner joining portion. The outer case has a plurality of outer case pieces that are spaced from each other. Each outer case piece is joined to a portion, on an outer surface of the inner case, which portion is different from the inner joining portion.

According to the above configuration, each outer case piece of the outer case is jointed to a portion, on the outer surface of the inner case, which portion is different from the inner joining portion. Thus, rigidity of the inner case is enhanced in the joining portion between the inner and outer cases. Accordingly, even if the capacity is increased in order to enhance silencing effect, by setting the joining portion in a planar portion of the outer shape, vibration due to difference in pressure of the exhaust gas is reduced, resulting in radiated vibration sound or radiated sound being reduced. Further, a plurality of outer case pieces are disposed on the outer surface of the inner case so as to be spaced from each other. Therefore, while the size of the outer case is reduced, rigidity of the inner case can be effectively enhanced in a desired portion. Moreover, the inner case to be covered by the outer case may have protrusions and recesses or the like for reducing vibration, with no regard to an outer appearance.

In the present invention, the outer case pieces are preferably disposed over a division surface of the first and the second inner case halves, and are preferably joined to both the inner case halves. According to this configuration, the outer case pieces are disposed over the division surface, and joined to the two inner case halves of the inner case. Thus, the inner case can be prevented from greatly expanding in a direction perpendicular to the division surface of both the inner case halves.

In the present invention, the outer case preferably covers the inner case from an outer lateral side of a vehicle body. According to this configuration, the inner case having a complicated shape is not exposed to the outer lateral side, thereby improving an outer appearance of the vehicle.

In the present invention, a portion of the inner case is preferably exposed to an outside. According to this configuration, not all the outer circumference of the inner case is covered by the outer case. Therefore, the size of the outer case can be reduced. Further, a portion of the inner case at which rigidity needs to be enhanced, or a portion of the inner case to be covered for improving the outer appearance is selected, and the outer case can be disposed according to the selection.

When a portion of the inner case is exposed to the outside, it is preferable that the first inner case half and the second inner case half of the inner case are separable in a vertical or up-down direction, center portions, in a vehicle widthwise direction, of an upper surface and a lower surface of the inner case are exposed to the outside, and the outer case covers an outer side portion outward of the exposed center portion in the vehicle widthwise direction, and is joined to the exposed center portion. According to this configuration, since the inner case is divided into two parts, that is, the upper portion and lower portion, an internal space of the exhaust chamber can be easily formed into a flattened shape that has a small dimension in the vertical direction and a large dimension in the vehicle widthwise direction by a plate material being subjected to shallow drawing. Thus, by the dimension in the vertical direction being reduced, the size of the outer case for covering the inner case from the outer lateral sides, can be reduced, and, by the dimension of the inner case in the vehicle widthwise direction or left-right direction being increased, the capacity of the exhaust chamber can be increased. Further, since the outer case covers only the outer lateral portions of the inner case, the dimension of the outer case in the vehicle widthwise direction can be reduced. Therefore, the outer case can be easily formed by a plate material being subjected to shallow drawing.

In this case, a bracket for attachment to a vehicle body frame is preferably provided in the exposed center portion of the first inner case half on an upper side. According to this configuration, the bracket can be provided in a large space on the upper surface of the inner case. Further, when the bracket is provided, the rigidity of the upper surface of the inner case is enhanced.

In the present invention, a heat insulation space is preferably formed between the inner case and the outer case.

According to this configuration, heat insulation in the exhaust chamber is improved.

In the present invention, an endless reinforcing belt member is preferably disposed on an inner surface of the inner case so as to extend in a direction that intersects a division surface of the inner case. Here, "endless" represents a continuous loop-like shape having no end. According to this configuration, rigidity of the inner case is further enhanced, and radiated vibration sound can be still further reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims (What is claimed is). In the accompanying drawings, like reference numerals are used to denote like parts throughout the several views, and:

DESCRIPTION OF PREFERRED EMBODIMENTS

Hereinafter, a preferred embodiment of the present invention will be described with reference to the drawings. In the description herein, the left-right direction represents the left-right direction as viewed from a rider riding a motorcycle.

Figure 1:
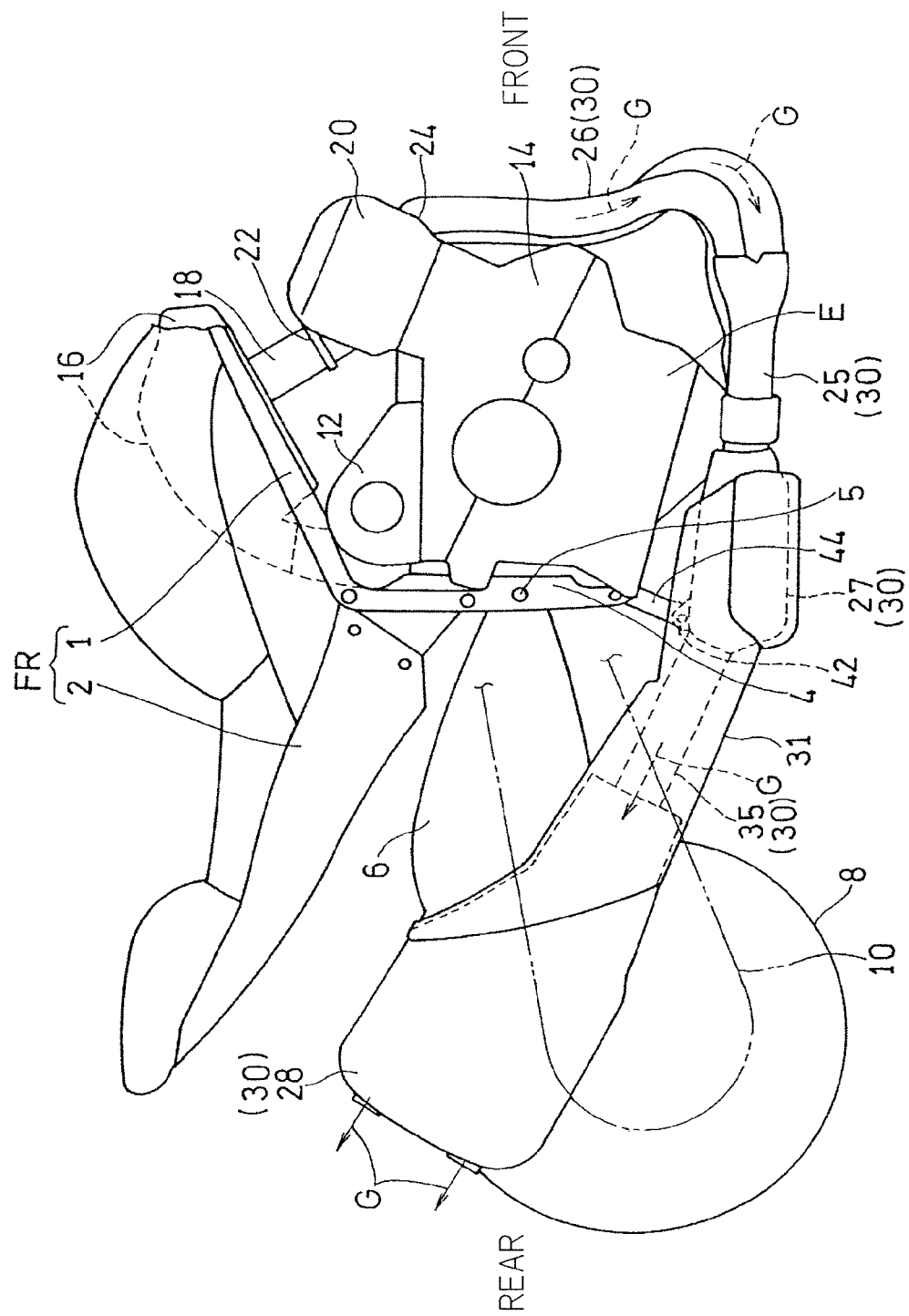
FIG. 1 is a side view illustrating a rear portion of a motorcycle which is one kind of a saddle-riding type vehicle having an exhaust chamber according to a preferred embodiment of the present invention.

FIG. 1 is a side view illustrating a rear portion of a motorcycle that has an exhaust chamber for an engine according to a preferred embodiment of the present invention. The motorcycle has a vehicle body frame FR, and the vehicle body frame FR includes a main frame 1 that forms a front half of the vehicle body frame FR, and a rear frame 2 that is joined to a rear portion of the main frame 1 and forms a rear half of the vehicle body frame FR. A front wheel is supported at the front end portion of the main frame 1 through a not-illustrated front fork.

A swing arm bracket 4 is provided at the lower portion of the rear end of the main frame 1, and a swing arm 6 is supported by the swing arm bracket 4 through a pivot 5 so as to be able to swing in the vertical direction. A rear wheel 8 is supported at the rear end portion of the swing arm 6. A combustion engine E is disposed below the center portion of the main frame 1, and the rear wheel 8 is driven by the combustion engine E through a power transmitting member 10 such as a chain. The combustion engine E is, for example, a parallel multi-cylinder four-cycle engine, but is not limited to this.

The combustion engine E of the present embodiment has a supercharger 12 mounted thereto. Specifically, the supercharger 12 is disposed above a rear portion of a crank case 14 of the combustion engine E, and intake air pressurized by the supercharger 12 is stored in an intake air chamber 16 disposed above the supercharger 12, and supplied to the combustion engine E, through a throttle body 18, from an intake port 22 formed on a rear face of a cylinder head 20 of the combustion engine E.

A plurality of exhaust pipes 26 connected to exhaust ports 24 positioned in the front portion of the cylinder head 20 of the combustion engine E are merged into a merging exhaust pipe 25 below the combustion engine E, and connected to a muffler 28 through an exhaust chamber 27 and a connecting pipe 35. The exhaust pipes 26, the merging exhaust pipe 25, the exhaust chamber 27, the connecting pipe 35 and the muffler 28 cooperate together to form an exhaust passage 30. The muffler 28 is disposed on the outer lateral side of the rear wheel 8, for example, to the right of the rear wheel 8 in the lateral direction, and the exhaust chamber 27 and the muffler 28 are partially covered by a cover 31 from the outer lateral side.

The exhaust chamber 27 is disposed upstream of the muffler 28 and downstream of the merging exhaust pipe 25 with respect to a direction of flow of exhaust gas. Further, the exhaust chamber 27 is disposed in front of the rear wheel 8 and below the combustion engine E.

Figure 2:
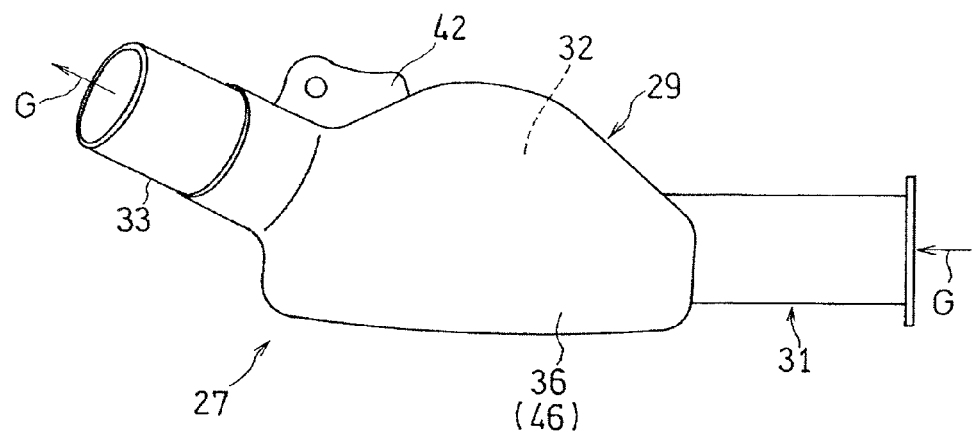
FIG. 2 is a side view of the exhaust chamber.
Figure 3:
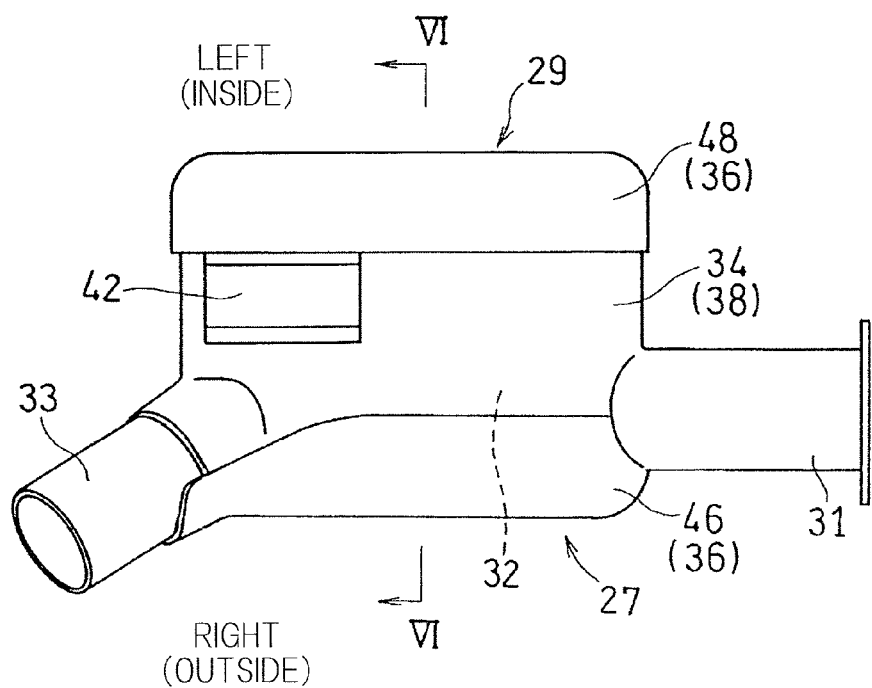
FIG. 3 is a plan view of the exhaust chamber.
Figure 4:
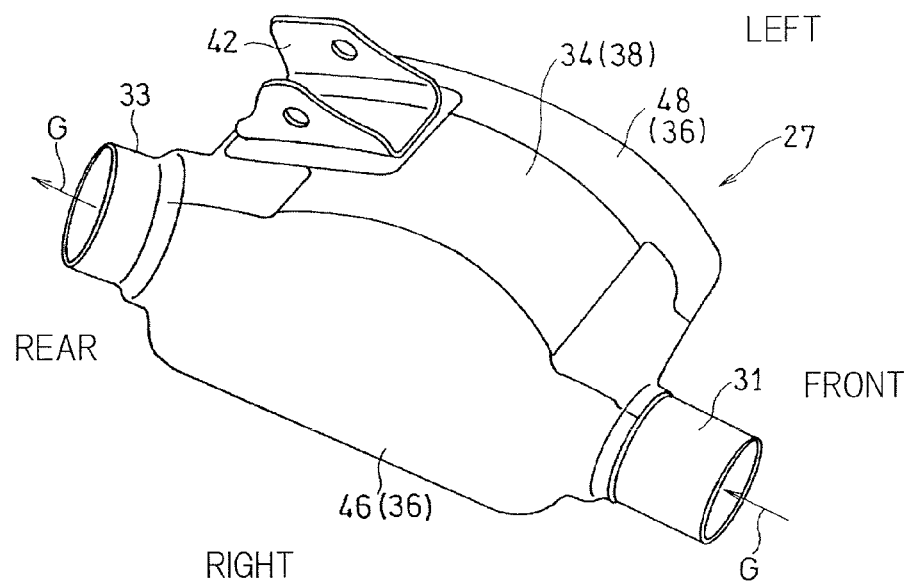
FIG. 4 is a perspective view of the exhaust chamber.

FIGS. 2 to 4 are a side view, a plan view, and a perspective view, respectively, of the exhaust chamber 27. As shown in FIG. 2, the exhaust chamber 27 includes: a chamber body 29 having a chamber expansion region or space 32 therein; a chamber inlet pipe 31 through which the exhaust gas G is introduced into the chamber expansion region 32; and a chamber outlet pipe 33 through which the exhaust gas G is discharged from the chamber expansion region 32. The chamber body 29, the chamber inlet pipe 31, and the chamber outlet pipe 33 are integrated by welding. The chamber inlet pipe 31 and the chamber outlet pipe 33 are connected to the merging exhaust pipe 25 and the connecting pipe 35, respectively, shown in FIG. 1.

As shown in FIG. 3, the chamber body 29 of the exhaust chamber 27 has an inner case 34 forming the chamber expansion region 32, and an outer case 36 that covers a portion of the inner case 34. The inner case 34 and the outer case 36 are made of the same kind of metal, for example, stainless steel. In order to improve outer appearance, the outer case 36 may be subjected to surface treatment, coating, or the like.

Figure 5:
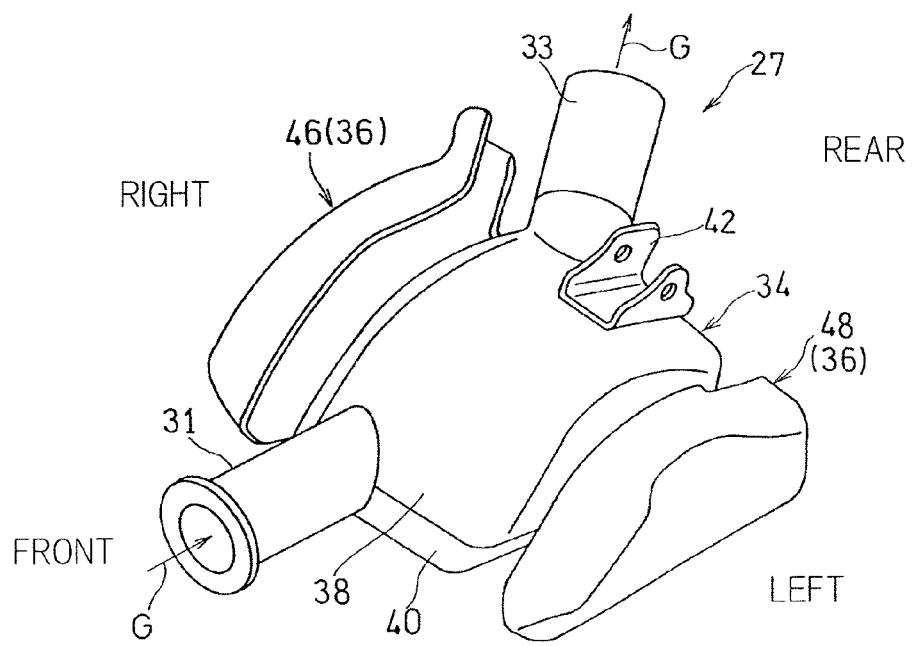
FIG. 5 is an exploded perspective view of the exhaust chamber.

FIG. 5 is a perspective view illustrating a state where the inner case 34 and the outer case 36 are separated. As shown in FIG. 5, the inner case 34 has a two-part structure formed by the inner case 34 being divided into two parts in the vertical direction, such that the inner case 34 has a first inner case half 38 disposed on the upper side and a second inner case half 40 disposed on the lower side. The first and second inner case halves 38 and 40 are joined to each other by welding.

As shown in FIG. 3, the outer case 36 covers inner and outer lateral faces, of the inner case 34, in the vehicle widthwise direction from the inner lateral side and the outer lateral side of the vehicle body. However, a portion of the inner case 34, for example, a portion of the upper surface and a portion of the lower surface of the inner case 34 in the present embodiment, is exposed to the outside. A bracket 42 for attachment to the vehicle body frame as shown in FIG. 4 is provided in the exposed portion of the upper surface of the inner case 34. As shown in FIG. 1, the exhaust chamber 27 is supported at the lower end of the swing arm bracket 4 through a stay 44 joined to the bracket 42.

As shown in FIG. 3, the outer case 36 has a first outer case piece 46 and a second outer case piece 48, and the first and second outer case pieces 46 and 48 are spaced from each other in the vehicle widthwise direction of the inner case 34. The first outer case piece 46 covers the right side portion (the outer side of the vehicle body) of the inner case 34, and the second outer case piece 48 covers the left side portion (the inner side of the vehicle body) of the inner case 34. The entirety of the opening edge of each of the first and the second outer case pieces 46 and 48 is welded to the outer surface of the inner case 34.

Figure 6:
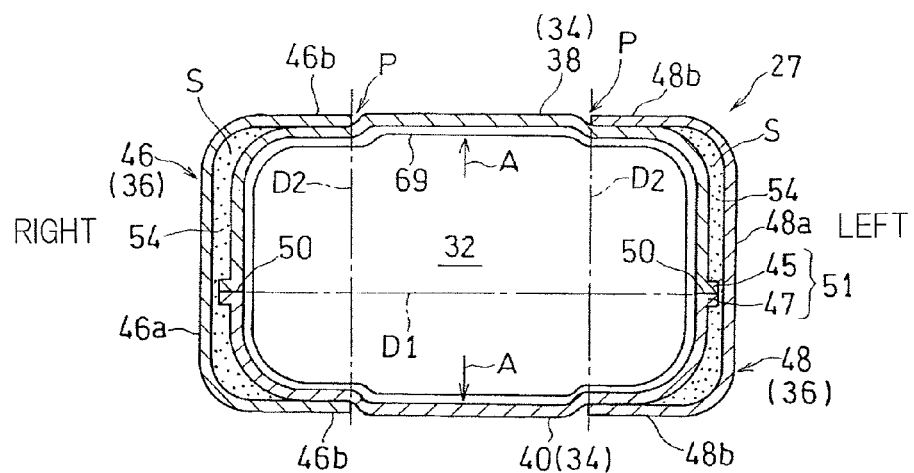
FIG. 6 is a cross-sectional view taken along a line VI-VI in FIG. 3.

Specifically, as shown in FIG. 6 that is a cross-sectional view as taken along a line VI-VI in FIG. 3, a division surface D1 is defined in the inner case 34 at a mid-portion, of the inner case 34, in the vertical direction. An inner joining portion 51 is formed by flanges 45, 47 forming the division surface D1. While opposing joining surfaces 50 of both the flanges 45 and 47 are brought into contact with each other, the first inner case half 38 and the second inner case half 40 are welded to each other.

On the other hand, the first and the second outer case pieces 46 and 48 of the outer case 36 include: body portions 46*a* and 48*a* that cover the outer lateral sides of the inner case 34; and outer and inner joining portions 46*b* and 48*b* that extend from the body portions 46*a* and 48*a* toward the inner case 34 and are joined to the outer surfaces of the inner case 34. Each of the outer case pieces 46 and 48 is disposed over the division surface D1 of the first and the second inner case halves 38 and 40.

That is, the upper joining portions 46*b* and 48*b* of the first and the second outer case pieces 46 and 48 are joined to portions P which are different from the inner joining portion 51 on the outer surface of the first inner case half 38 (the upper surface of the inner case 34), and the lower joining portions 46*b* and 48*b* of the first and the second outer case pieces 46 and 48 are joined to the outer surface of the second inner case half 40 (the lower surface of the inner case 34).

The chamber expansion region 32 is formed into a flattened shape having a dimension reduced in the vertical direction, that is, formed such that a dimension in the vertical direction is less than a dimension in the vehicle widthwise direction and a dimension in the front-rear direction or longitudinal direction. Further, in the present embodiment, the dimension in the longitudinal direction is greater than the dimension in the vehicle widthwise direction. The inner case 34 is divided in the vertical direction in which the dimension is reduced for the flattened shape. The outer case 36 of the present embodiment is divided into two parts in the vehicle widthwise direction. A dimension in the vehicle widthwise direction is the lesser of dimensions in the directions perpendicular to the vertical direction, and the dimension in the vertical direction is reduced to flatten the shape.

The division surface D1 of the inner case 34 and division surfaces D2 of the outer case 36 preferably intersect each other, and are more preferably perpendicular to each other. In the present embodiment, the division surface D1 and the division surface D2 are substantially perpendicular to each other. Here, "substantially perpendicular" represents an intersection angle of 80° to 90°. Further, in the present embodiment, the outer case 36 does not cover the center portions, in the vehicle widthwise direction, of the upper surface and the lower surface of the inner case 34. The exposed center portions of the upper surface and the lower surface of the inner case 34 are raised outward by an amount corresponding to the thickness of the outer case 36. Thus, positioning of the outer case 36 is facilitated.

A heat-insulation space S, which is closed, is formed between the inner case 34 and the outer case 36. In the present embodiment, a heat-insulation material 54 is interposed in the heat-insulation space S. The heat-insulation material 54 is, for example, glass wool. A plurality of spacer members may be welded to the left and the right outer side surfaces of the inner case 34, and the inner surface of the outer case 36 may be brought into contact with the spacer members, to form the heat-insulation spaces S that have a predetermined interval.

Figure 7:
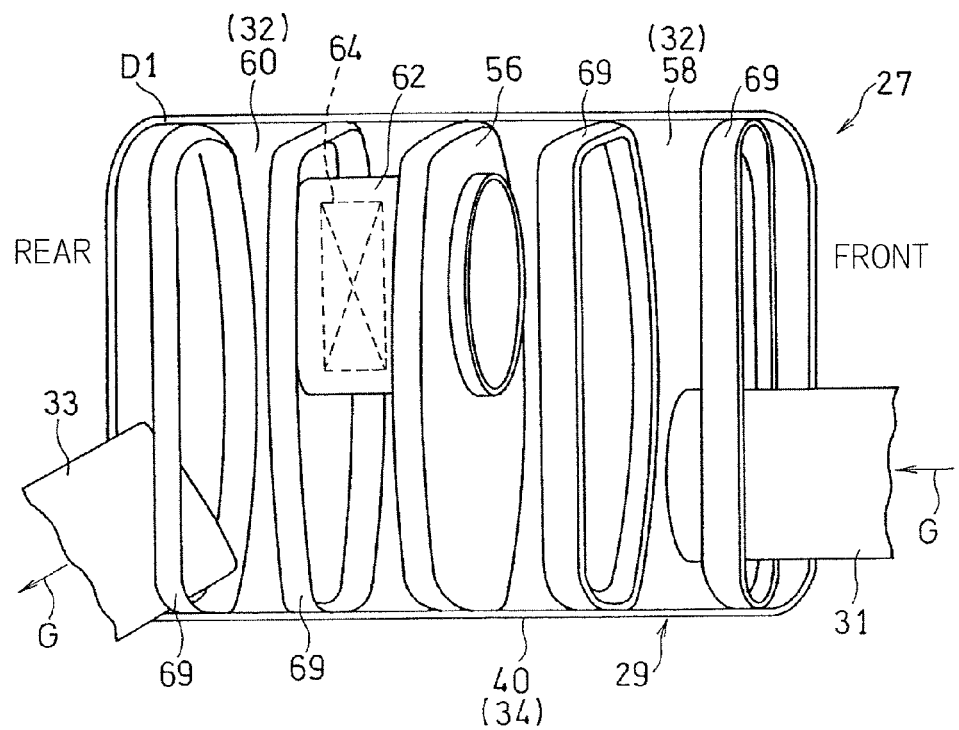
FIG. 7 is a plan view illustrating an inside of the exhaust chamber.

FIG. 7 is a plan view illustrating an inside of the exhaust chamber 27. As shown in FIG. 7, the chamber expansion region 32 in the exhaust chamber 27 is sectioned into a first expansion chamber 58 on the upstream side and a second expansion chamber 60 on the downstream side by a dividing wall 56. The first expansion chamber 58 and the second expansion chamber 60 communicate with each other via a through pipe 62 that penetrates through the dividing wall 56. A catalyst 64 for exhaust purification is disposed inside the through pipe 62.

An endless reinforcing belt member 69 is attached to the inner surface of the inner case 34 so as to extend in a direction that intersects the division surface D1 of the inner case 34. The reinforcing belt member 69 has a quadrangular-loop-like shape that fits with the inner surface of the inner case 34, and is fixed, by welding, to the inner surface of one of the first and the second inner case halves 38, 40, in this embodiment, the inner surface of the first inner case half 38 in FIG. 7. In the present embodiment, the four reinforcing belt members 69 are aligned in the longitudinal direction. However, the number of the reinforcing belt members 69 is not limited to four. Further, the internal structure of the exhaust chamber 27 is not limited to the illustrated one.

In the above structure, the first and the second outer case pieces 46 and 48 of the outer case 36 shown in FIG. 6 are jointed to the portions P, on the outer surface of the inner case 34, which are different from the inner joining portion 51. Thus, rigidity of the inner case 34 is enhanced in the joining portions P. Accordingly, even if the capacity of the chamber expansion region 32, that is, the outer shape of the inner case 34 is increased in order to enhance silencing effect, by setting the joining portions P for joining to the outer case 36 in a planar portion of the outer shape, vibration due to difference in pressure of the exhaust gas G is reduced, resulting in radiated vibration sound being reduced. Further, the first and second outer case pieces 46 and 48 are disposed on the outer surface of the inner case 34 so as to be spaced from each other. Therefore, while the size of the outer case 36 is reduced, rigidity of the inner case 34 can be effectively enhanced in a desired portion.

Further, the first and the second outer case pieces 46 and 48 are disposed over the division surface D1 of the first and the second inner case halves 38 and 40, and joined to both the inner case halves 38 and 40 in the upper and lower joining portions 46*b* and 48*b*. Thus, the upper surface and the lower surface of the inner case 34 can be prevented from greatly expanding in the vertical direction (directions indicated by arrows A in FIG. 6) that is perpendicular to the division surface D1.

The shape of the inner case 34 is complicated, and is formed so as to have a so-called "two-part structure". In the above structure, the outer case 36 covers the inner case 34 from the left and right sides. Therefore, the inner case 34 having a complicated shape is not exposed on the outer lateral side of the vehicle body, thereby improving an outer appearance of the motorcycle.

A portion of the inner case 34, specifically, the center portion, in the vehicle widthwise direction, of each of the upper surface and the lower surface of the inner case 34 is not covered by the outer case 36 and is exposed to the outside. However, as shown in FIG. 1, the combustion engine E is disposed above the exhaust chamber 27, and the ground is below the exhaust chamber 27. Thus, a region above the exhaust chamber 27 and a region below the exhaust chamber 27 are less likely to be seen from the outside. Accordingly, even when these regions are not covered by the outer case 36, the outer appearance does not become bad. Thus, since not all the outer circumference of the inner case 34 is covered by the outer case 36, the size of the outer case 36 can be reduced, and also, a portion of the inner case 34 at which rigidity needs to be enhanced, a portion of the inner case 34 to be covered for improving the outer appearance, or the like is selected, and the outer case 36 can be disposed according to the selection.

Since the inner case 34 shown in FIG. 6 is divided into two parts, that is, the upper portion and lower portion, the chamber expansion region 32 in the exhaust chamber 27 can be easily formed into a flattened shape that has a small dimension in the vertical direction and a large dimension in the vehicle widthwise direction (the left-right direction) by a plate material being subjected to shallow drawing. Thus, by the dimension in the vertical direction being reduced, the size of the outer case 36 for covering the inner case 34 from the left and the right sides can be reduced, and, by the dimension of the inner case 34 in the vehicle widthwise direction being increased, the capacity of the exhaust chamber 27 can be increased. Further, since the outer case 36 covers only the outer lateral portions of the inner case 34, the dimension of the outer case 36 in the vehicle widthwise direction can be reduced. Therefore, the outer case 36 can be easily formed by a plate material being subjected to shallow drawing.

As shown in FIG. 4, the bracket 42 for attachment to the vehicle body frame is provided in an exposed portion, of the upper surface of the inner case 34, which is not covered by the outer case 36. Thus, the bracket 42 can be provided in a large space on the upper surface of the inner case 34. Further, when the bracket 42 is provided, the rigidity of the upper surface of the inner case 34 is enhanced, to prevent upward expansion.

The heat-insulation space S is formed between the inner case 34 and the outer case 36 as shown in FIG. 6. Thus, heat insulation in the exhaust chamber 27 is improved. Further, since the heat-insulation space S is filled with the heat-insulation material 54, heat insulation in the exhaust chamber 27 is improved effectively.

The endless reinforcing belt member 69 is attached to the inner surface of the inner case 34 as shown in FIG. 7. Therefore, rigidity of the inner case 34 is further enhanced, and radiated vibration sound can be reduced effectively.

Although, in the above embodiment, a double structure including the inner case 34 and the outer case 36 is described as an example, a triple structure may be used. Specifically, a first inner case, a second inner case, and the outer case 36 as described above may be provided such that the first inner case forms the chamber expansion region and is provided on the inner side, the second inner case covers the entirety of the first inner case, and the outer case 36 covers a portion or the entirety of the second inner case. In this case, a heat-insulation space may be provided between both the inner cases, and the reinforcing belt member 69 may be attached to the outer surface of the first inner case provided on the inner side.

The present invention is not limited to the embodiment described above, and various additions, modifications, or deletions may be made without departing from the gist of the invention. For example, although, in the above embodiment, the outer case 36 has a two-part structure in which the outer case 36 is divided into two in the vehicle widthwise direction, a plurality of outer case pieces may be spaced from each other in the circumferential direction of the inner case 34. Further, a surface of the inner case 34 other than the upper surface and the lower surface thereof may be exposed to the outside. Further, the present invention is applicable to saddle-riding type vehicles such as three-wheeled vehicles and four-wheeled buggies as well as motorcycles. Therefore, these are construed as included within the scope of the present invention.

REFERENCE NUMERALS

27 . . . exhaust chamber
30 . . . exhaust passage
32 . . . chamber expansion region
34 . . . inner case
36 . . . outer case
38 . . . first inner case half
40 . . . second inner case half
42 . . . bracket
46 . . . first outer case piece
48 . . . second outer case piece
51 . . . inner joining portion
69 . . . reinforcing belt member
E . . . combustion engine
G . . . exhaust gas
P . . . different portion
S . . . heat-insulation space

What is claimed is:

1. An exhaust chamber, for a saddle-riding vehicle, disposed in an exhaust passage through which exhaust gas from an engine of the saddle-riding vehicle passes, the exhaust chamber comprising:
    an inner case having a chamber expansion region therein; and
    an outer case configured to cover at least a portion of the inner case, the outer case being made of metal, wherein
    the inner case has a first inner case half and a second inner case half which are obtained by division into two parts, and is formed by the first inner case half and the second inner case half being joined to each other at an inner joining portion,
    the outer case has a plurality of outer case pieces that are spaced from each other,
    each of the plurality of outer case piece is joined to a portion, on an outer surface of the inner case, which portion is different from the inner joining portion, and each of the plurality of outer case pieces are disposed over a first division surface of the first and the second inner case halves, and are joined to both of the inner case halves.

2. The exhaust chamber for a saddle-riding vehicle as claimed in claim 1, wherein the outer case covers the inner case from an outer lateral side of a vehicle body.

3. The exhaust chamber for a saddle-riding vehicle as claimed in claim 1, wherein the inner case includes a first portion covered by the outer case and a second portion which is not covered by the outer case.

4. The exhaust chamber for a saddle-riding vehicle as claimed in claim 1, wherein a heat insulation space is formed between the inner case and the outer case.

5. The exhaust chamber for a saddle-riding vehicle as claimed in claim 1, wherein the outer case is welded to the inner case.

6. The exhaust chamber for a saddle-riding vehicle as claimed in claim 5, wherein the entirety of an opening edge of the outer case is welded to the inner case.

7. The exhaust chamber for a saddle-riding vehicle as claimed in claim 5, wherein the inner case and the outer case are made of the same kind of metal.

8. The exhaust chamber for a saddle-riding vehicle as claimed in claim 1, wherein the first division surface of the inner case and a second division surface of the outer case intersect with each other.

9. The exhaust chamber for a saddle-riding vehicle as claimed in claim 1, wherein the chamber expansion has a flattened smaller dimension in a vertical direction and a larger dimension in a vehicle widthwise direction.

10. The exhaust chamber for a saddle-riding vehicle as claimed in claim 6, wherein the first division surface of the inner case and a second division surface of the outer case intersect with each other.

11. An exhaust chamber, for a saddle-riding vehicle, disposed in an exhaust passage through which exhaust gas from an engine of the saddle-riding vehicle passes, the exhaust chamber comprising:
    an inner case having a chamber expansion region therein; and
    an outer case configured to cover at least a portion of the inner case, wherein
    the inner case has a first inner case half and a second inner case half which are obtained by division into two parts, and is formed by the first inner case half and the second inner case half being joined to each other at an inner joining portion,
    the outer case has a plurality of outer case pieces that are spaced from each other,
    each of the plurality of outer case pieces are joined to a portion, on an outer surface of the inner case, which portion is different from the inner joining portion,
    the inner case includes a first portion covered by the outer case and a second portion which is not covered by the outer case,
    the first inner case half and the second inner case half of the inner case are separable in a vertical direction,
    center portions, in a vehicle widthwise direction, of an upper surface and a lower surface of the inner case are formed with the second portion, and
    the outer case covers an outer side portion outward of the second portion in the vehicle widthwise direction, and is joined to the inner case.

12. The exhaust chamber for a saddle-riding vehicle as claimed in claim 11, wherein a bracket for attachment to a vehicle body frame is provided in the exposed center portion of the first inner case half on an upper side.

13. An exhaust chamber, for a saddle-riding vehicle, disposed in an exhaust passage through which exhaust gas from an engine of the saddle-riding vehicle passes, the exhaust chamber comprising:
    an inner case having a chamber expansion region therein; and
    an outer case configured to cover at least a portion of the inner case, wherein
    the inner case has a first inner case half and a second inner case half which are obtained by division into two parts, and is formed by the first inner case half and the second inner case half being joined to each other at an inner joining portion,
    the outer case has a plurality of outer case pieces that are spaced from each other,
    each of the plurality of outer case pieces are joined to a portion, on an outer surface of the inner case, which portion is different from the inner joining portion, and
    an endless reinforcing belt member is disposed on an inner surface of the inner case so as to extend in a direction that intersects the first division surface of the inner case.

14. The exhaust chamber for a saddle-riding vehicle as claimed in claim 13, wherein the endless reinforcing belt member is attached to the inner surface of the inner case by a weld to enhance rigidity of the inner case and reduce vibration sounds.

* * * * *